US009336160B2

(12) United States Patent
Hawkes et al.

(10) Patent No.: US 9,336,160 B2
(45) Date of Patent: May 10, 2016

(54) LOW LATENCY BLOCK CIPHER

(75) Inventors: Philip Michael Hawkes, Warrimoo (AU); Lu Xiao, San Diego, CA (US); Gregory Gordon Rose, San Diego, CA (US); Steve Millendorf, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1161 days.

(21) Appl. No.: 12/262,092

(22) Filed: Oct. 30, 2008

(65) Prior Publication Data

US 2010/0115286 A1 May 6, 2010

(51) Int. Cl.
*G06F 12/14* (2006.01)
*H04L 9/08* (2006.01)
*H04L 9/06* (2006.01)

(52) U.S. Cl.
CPC .......... *G06F 12/1408* (2013.01); *H04L 9/0618* (2013.01); *H04L 2209/125* (2013.01); *H04L 2209/24* (2013.01)

(58) Field of Classification Search
CPC .............. G06F 12/1408; H04L 9/0816; H04L 2209/125; H04L 2209/24
See application file for complete search history.

(56) References Cited

U.S. PATENT DOCUMENTS

| | | | | |
|---|---|---|---|---|
| 4,278,837 A | * | 7/1981 | Best .................... | G06F 12/1408 200/61.08 |
| 4,319,079 A | * | 3/1982 | Best ............................ | 713/190 |
| 6,014,445 A | * | 1/2000 | Kohda et al. .................... | 380/28 |
| 6,061,449 A | * | 5/2000 | Candelore et al. .............. | 380/28 |
| 6,345,359 B1 | | 2/2002 | Bianco | |
| 8,000,471 B2 | * | 8/2011 | Mantin et al. ................... | 380/44 |
| 8,155,308 B1 | * | 4/2012 | Poo ....................... | H04L 9/0631 380/29 |
| 2003/0037248 A1 | * | 2/2003 | Launchbury ........ | G06F 12/1408 713/193 |
| 2003/0065933 A1 | * | 4/2003 | Hashimoto et al. ........... | 713/194 |

(Continued)

FOREIGN PATENT DOCUMENTS

| | | |
|---|---|---|
| CN | 1565102 A | 1/2005 |
| EP | 1978467 A1 | 10/2008 |

(Continued)

OTHER PUBLICATIONS

Stallings, William. "Cryptography and Network Security, Principles and Practice," Third Edition, Pearson Education Inc, 2003, pp. 72-77, 139-149.*

(Continued)

*Primary Examiner* — Darren B Schwartz
(74) *Attorney, Agent, or Firm* — Won Tae C. Kim

(57) ABSTRACT

A block cipher is provided that secures data by encrypting it based on the memory address where it is to be stored. When encrypting data for storage in the memory address, the memory address is encrypted in a first plurality of block cipher rounds. Data round keys are generated using information from the first plurality of block cipher rounds. Data to be stored is combined with the encrypted memory address and encrypted in a second plurality of block cipher rounds using the data round keys. The encrypted data is then stored in the memory location. When decrypting data, the memory address is again encrypted as before while the encrypted stored data is decrypted in a second plurality of the block cipher rounds using the data round keys to obtain a partially decrypted data. The partially decrypted data is combined with the encrypted memory address to obtain fully decrypted data.

49 Claims, 13 Drawing Sheets

(56) References Cited

U.S. PATENT DOCUMENTS

| | | | |
|---|---|---|---|
| 2003/0084308 A1 | 5/2003 | Van Rijnswou | |
| 2005/0154912 A1* | 7/2005 | Kim | G06F 21/72 726/26 |
| 2005/0213756 A1* | 9/2005 | Hubert | 380/44 |
| 2006/0101284 A1* | 5/2006 | Feuser | G06F 12/1408 713/189 |
| 2006/0129811 A1* | 6/2006 | Fiske | 713/167 |
| 2006/0265563 A1* | 11/2006 | Goettfert et al. | 711/164 |
| 2007/0098153 A1 | 5/2007 | Nishikawa | |
| 2007/0140477 A1 | 6/2007 | Wise | |
| 2007/0192592 A1 | 8/2007 | Goettfert et al. | |
| 2007/0286413 A1* | 12/2007 | Derouet | 380/28 |
| 2008/0056490 A1* | 3/2008 | Akishita et al. | 380/44 |
| 2008/0181395 A1 | 7/2008 | Okada et al. | |
| 2009/0319801 A1* | 12/2009 | Aciicmez | H04L 9/0872 713/189 |

FOREIGN PATENT DOCUMENTS

| | | |
|---|---|---|
| JP | 2005505069 A | 2/2005 |
| JP | 2005130059 A | 5/2005 |
| JP | 2007094377 A | 4/2007 |
| JP | 2008151829 A | 7/2008 |
| JP | 2008524901 A | 7/2008 |
| TW | 514844 B | 12/2002 |
| WO | 03030441 A2 | 4/2003 |
| WO | 2006067665 A1 | 6/2006 |

OTHER PUBLICATIONS

"The Authoritative Dictionary of IEEE Standards Terms, Seventh Edition," IEEE Press, 2000, pp. 593 and 1028.*

International Search Report and the Written Opinion—PCT/US2009/062391, International Search Authority—European Patent Office—Apr. 1, 2010.

Jun Yang et al: "Improving Memory Encryption Performance in Secure Processors" IEEE Transactions on Computers, IEEE Service Center, Los Alamitos, CA, US, vol. 54, No. 5, May 1, 2005, pp. 630-640, XP011128664 ISSN: 0018-9340.

Menezes., A., et al., "Handbook of Applied Cryptography", CRC Press, pp. 252-266, 1996.

Taiwan Search Report—TW098136953—TIPO—Dec. 17, 2012.

* cited by examiner

LOW LATENCY BLOCK CIPHER

BACKGROUND

1. Field

One feature relates to the protection of memory content and particularly to a method of using block ciphers to secure content stored to memory devices.

2. Background

Digital processors exist in many devices such as cellular phones, computers, personal digital assistants (PDAs), wireless network access points and so on. Increasingly, there is a need for programs and data stored in memory to be secure against attackers with fairly sophisticated tools. Digital Rights Management applications also impose such restrictions to control access to or usage of digital data or hardware. For example, it is usually the case that a central processing unit (CPU) has some on-chip memory storage, which may be made secure by ensuring that the data access lines are buried within the CPU or board, so that attempts to access the data will destroy the device and, presumably, scramble or destroy the data before it can be accessed.

For reasons of scale and economy, it is desirable to be able to package the memory in a separate chip. However, packaging a memory device in a separate chip makes it relatively easy for attackers to access by using simple tools, such as probes, since the data is exposed as it travels between the CPU and memory chips.

One method to address the lack of security when storing data to a distinct memory chip is to have an encryption process on the CPU so that data written to the memory chip is useless to the attacker. Conversely, when data is fetched from memory it is decrypted by the CPU. The address information for a particular block of memory, and a cryptographic key known only to the CPU are the other inputs to the encryption algorithm.

Since memory locations can be written repeatedly, often with patterned data, stream ciphers and corresponding modes of operation for block ciphers such as counter mode (CTR) are not appropriate. Block ciphers using the address as an initialization vector for a mode like Cipher Block Chaining (CBC) are the appropriate mechanism here. (See FIPS special publication 800-38A—Modes of operation for Block Ciphers). However, often the blocks of memory to be encrypted in one operation are small (e.g., often just a single block) compared to the cipher's native block size. Therefore, thinking of the CBC mode as "chaining" is counter-intuitive when applied to single blocks.

Modern block ciphers have a structure that is often referred to as an Iterated Block Cipher. Each iteration is termed a round, and a repeated function is termed the round function (e.g., anywhere between 4 to 32 rounds are typical). In each round, the round function achieves a certain amount of confusion and diffusion when applied to an input block. To encrypt an input block, the cipher generates a permutation of the input block. Decryption is achieved by running the process in reverse. Viewed as a black box, the cipher accepts as input a single block of data of a fixed size, and a secret key, repeatedly applies the round function to the input block, and outputs a single block of cipher output. Some ciphers allow variable sized keys, and the key size might be smaller, the same, or larger than the block size. For example, the Advanced Encryption Standard (AES) algorithm has a 128-bit block size, and can accept keys of 128, 192, or 256 bits.

Inside the cipher, there are a number of rounds (e.g., ten rounds in the case of AES with a 128-bit key). Each round has a round key as part of its input. The round keys are derived from the secret key in a process called key scheduling. Each round is intended to perform some nonlinear substitution on parts of the block and round key, followed by some (often linear) diffusion operation to spread out the effects of each substitution to the entire block. These actions are intended to defeat well-known forms of cryptanalysis such as linear and differential cryptanalysis.

For encrypting data sent to memory, the memory address may be utilized as an initialization vector. This would guarantee that different memory locations with the same data would nevertheless encrypt differently. The encryption could be written as:

$$C = E_K(P \oplus A)$$

where P is the input plaintext (the original data block), A is the memory address, C is the output ciphertext (the output data block that will appear in the memory chip at address A), $\oplus$ is the bitwise exclusive-OR (XOR) operation, and $E_K$ means using the block cipher to encrypt the block of data with the secret key K. Correspondingly, when data is to be read back out of memory, the inverse operation would be used:

$$P = D_K(C) \oplus A$$

where $D_K$ means using the block cipher in its decryption mode. However, typical block cipher applications have quite a high latency compared to the memory access speed. Pipelining addresses this problem for bulk encryption but doesn't help when encrypting single memory locations.

Therefore, a method is needed to implement block cipher encryption to a small number of memory locations while reducing latency.

SUMMARY

A block cipher is provided that secures data by encrypting it based on the memory address where it is to be stored. When encrypting data for storage in the memory address, the memory address is encrypted in a first plurality of block cipher rounds. Data round keys are generated using information from the first plurality of block cipher rounds. Data to be stored is combined with the encrypted memory address and encrypted in a second plurality of block cipher rounds using the data round keys. The encrypted data is then stored in the memory location. When decrypting data, the memory address is again encrypted as before while the encrypted stored data is decrypted in a second plurality of the block cipher rounds using the data round keys to obtain a partially decrypted data. The partially decrypted data is combined with the encrypted memory address to obtain fully decrypted data.

In one example of data encryption in a memory address, the memory address is encrypted in a first plurality of block cipher rounds. Encrypting the memory address may include: (a) transforming the memory address according to a first transform function, (b) mixing the transformed memory address with a round key, (c) segmenting the memory address, and/or (d) and/or performing bit substitution on the different memory address segments. The memory address may be available prior to the data to be stored. Consequently, encrypting the memory address may begin before the data is available.

Data round keys may be generated using information from one or more of the first plurality of block cipher rounds. Generating the data round keys may include: (a) extracting a plurality of bits from the encrypted memory address for at least some of the first plurality of block cipher rounds, (b) selecting the data round keys from segments of the extracted plurality of bits, and/or (c) concatenating the extracted plurality of bits into a string from which the data round keys are selected.

The data may be combined with the encrypted memory address after the first plurality of block cipher rounds. For instance, the data may be combined with the encrypted memory address by an invertible operation (e.g., modular addition/subtraction, a bitwise XOR operation, etc.). The data may then be encrypted in a second plurality of block cipher rounds using the data round keys. The second plurality of block cipher rounds is greater than the first plurality of block cipher rounds. Encrypting the data may include: (a) transforming the data according to a second transform function, (b) mixing the transformed data with one or more of the data round keys, (c) segmenting the data into a plurality of data segments, and/or (d) performing bit substitution on the different data segments.

The memory address may be iteratively encrypted over the first plurality of block cipher rounds, and the data may be iteratively encrypted over the second plurality of block cipher rounds. In one example, the data round keys used for earlier rounds of the second plurality of block cipher rounds may be generated using bits from the encrypted memory address from later rounds of the first plurality of block cipher rounds. The encrypted data may be subsequently stored in the memory address.

In another example of decrypting data in a memory address, the memory address is encrypted in a first plurality of block cipher rounds obtain an encrypted memory address. Encrypting the memory address may begin before the data is available.

Encrypting the memory address may include: (a) transforming the memory address according to a first transform function, (b) mixing the transformed memory address with a round key, (c) segmenting the memory address, and/or (d) performing bit substitution on the different memory address segments.

Data round keys may be generated using information from one or more of the first plurality of block cipher rounds. Generating the data round keys may include: (a) extracting a plurality of bits from the encrypted memory address for at least some of the first plurality of block cipher rounds, (b) selecting the data round keys from segments of the extracted plurality of bits, and/or concatenating the extracted plurality of bits into a string from which the data round keys are selected.

The encrypted data may be retrieved from the memory address. The encrypted data may be decrypted in a second plurality of the block cipher rounds using the data round keys to obtain a partially decrypted data. Decrypting the encrypted data may include: (a) transforming the encrypted data according to a second inverse transform function, (b) mixing the transformed encrypted data with one or more of the data round keys, (c) segmenting the encrypted data into a plurality of encrypted data segments, and/or (d) performing bit substitution on the different encrypted data segments.

The partially decrypted data may be combined with the encrypted memory address to obtain fully decrypted data. In one example, the partially decrypted data may be combined with the encrypted memory address by an invertible operation (e.g., modular addition/subtraction, a bitwise XOR operation, etc.). The data round keys used for earlier rounds of the second plurality of block cipher rounds are generated using bits from the encrypted memory address from the earlier rounds of the first plurality of block cipher rounds. The second plurality of block cipher rounds is greater than the first plurality of block cipher rounds. The first plurality of block cipher rounds may be concurrently executed with the second plurality of block cipher rounds.

These methods may be implemented in hardware, software, and/or a combination thereof.

BRIEF DESCRIPTION OF THE DRAWINGS

The features, nature, and advantages of the present aspects may become more apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Overview

Several novel features address the latency caused by the use of a block cipher for writing and reading secured data to/from memory. Generally, there are many more read operations than write operations. In the prior art, encryption and decryption operations begin after the data is available on the internal bus (writing) or has been fetched from memory (reading). But in typical hardware designs the address information is available well before the data, particularly in the case of reading memory.

Figure 1:
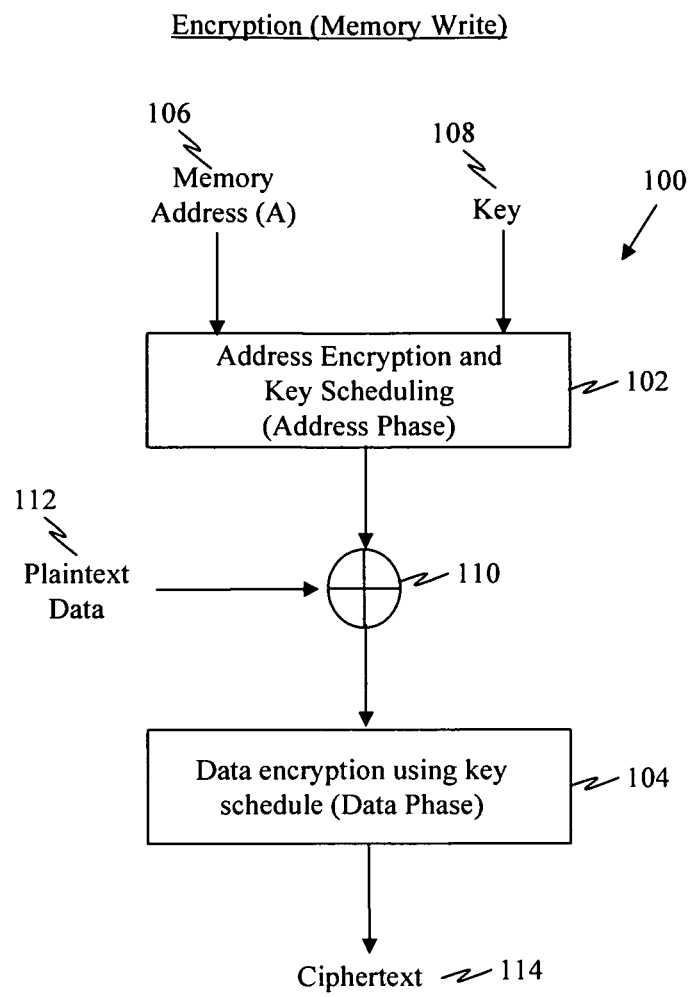
FIG. 1 is a block diagram illustrating a first feature that improves block cipher encryption processing by partially processing the block cipher before the plaintext input block is available, thereby reducing the latency of the block cipher.

FIG. 1 is a block diagram illustrating a first feature that improves block cipher encryption processing by partially processing the block cipher before the plaintext input block is available, thereby reducing the latency of the block cipher. This encryption process may be performed as part of a memory write operation and includes an Address Phase 102, where the memory address A 106 is encrypted, and a Data Phase 104, where the data is encrypted. A number of cipher rounds of an iterated block cipher are pre-processed using the memory address A 106 and a secret key 108 for the block cipher 100. The plaintext data 112 is inserted 110 (e.g., bitwise XORed with result of Address Phase 102) after a few rounds of the block cipher encryption. In particular, some rounds (i.e., the Address Phase rounds 102) of the block cipher 100 are performed before the plaintext data 112 is introduced, and some rounds (i.e., the Data Phase rounds 104) are performed after the plaintext data 112 is introduced to generate ciphertext 114. The Address Phase 102 may not just encrypt the memory address A 106 but may also use the results of those rounds to generate encryption keys for the subsequent Data Phase rounds 104 (i.e., key scheduling). The number of cipher rounds before and after the plaintext data 112 is introduced may be the same or different. This encryption process makes use of the fact that the memory address A 106 is available before the plaintext data 112 to reduce latency when encrypting data to be stored in memory.

Additionally, more efficient key scheduling may be performed for a block cipher. The round keys for each round of a block cipher may be generated based on the address data and secret key, before the actual plaintext data is available. Because the round keys are generated based on the memory address, this means that the block cipher transformation will be different for each memory address, thereby severely constraining the resources available to a cryptanalysis, and increasing the security of the block cipher.

Figure 2:
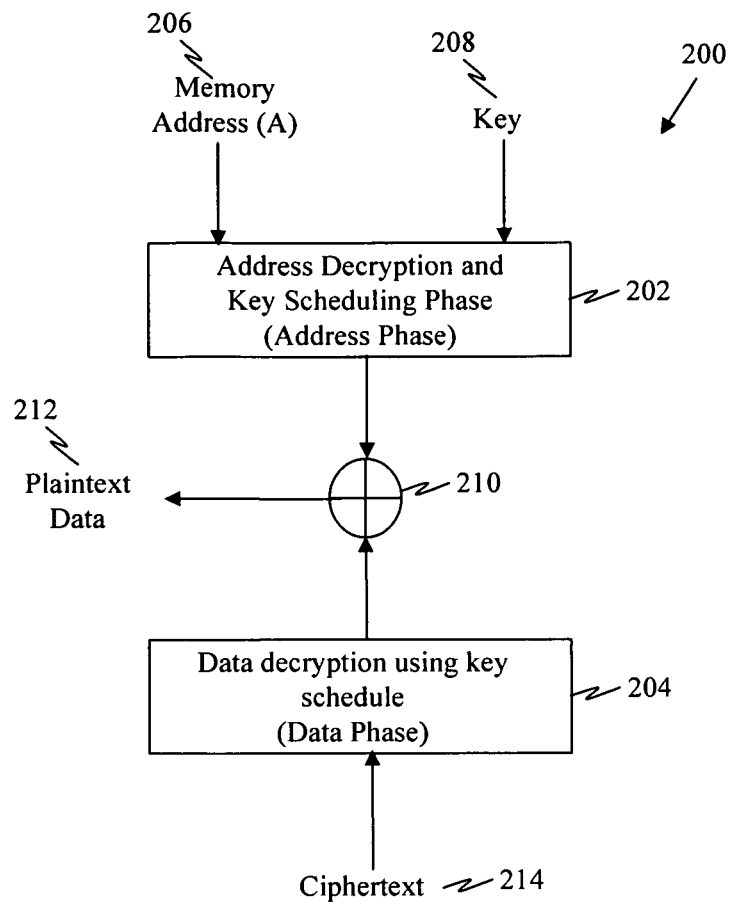
FIG. 2 is a block diagram illustrating a second feature that improves block cipher decryption by processing a first part of the block cipher in parallel with a second part of the block cipher, thereby reducing the latency of the block cipher.

FIG. 2 is a block diagram illustrating a second feature that improves block cipher decryption by processing a first part of the block cipher in parallel with a second part of the block cipher, thereby reducing the latency of the block cipher. This decryption process may be performed as part of a memory read operation and includes an Address Phase 202, where the memory address A 206 is encrypted, and a Data Phase 204, where the data is decrypted. Instead of running the whole block cipher backwards as is done in conventional decryption methods, the Data Phase 204 of the block cipher 200 is processed backwards starting with the ciphertext 214. At the same time, the Address Phase 202 of the block cipher 200 is run forward using the memory address A 206 and the secret key 208 as inputs. When these processes meet in the middle 210, the plaintext data 212 is derived by XORing the partly decrypted ciphertext and the partly encrypted memory address.

Efficient Encryption Using Block Cipher

Figure 3:
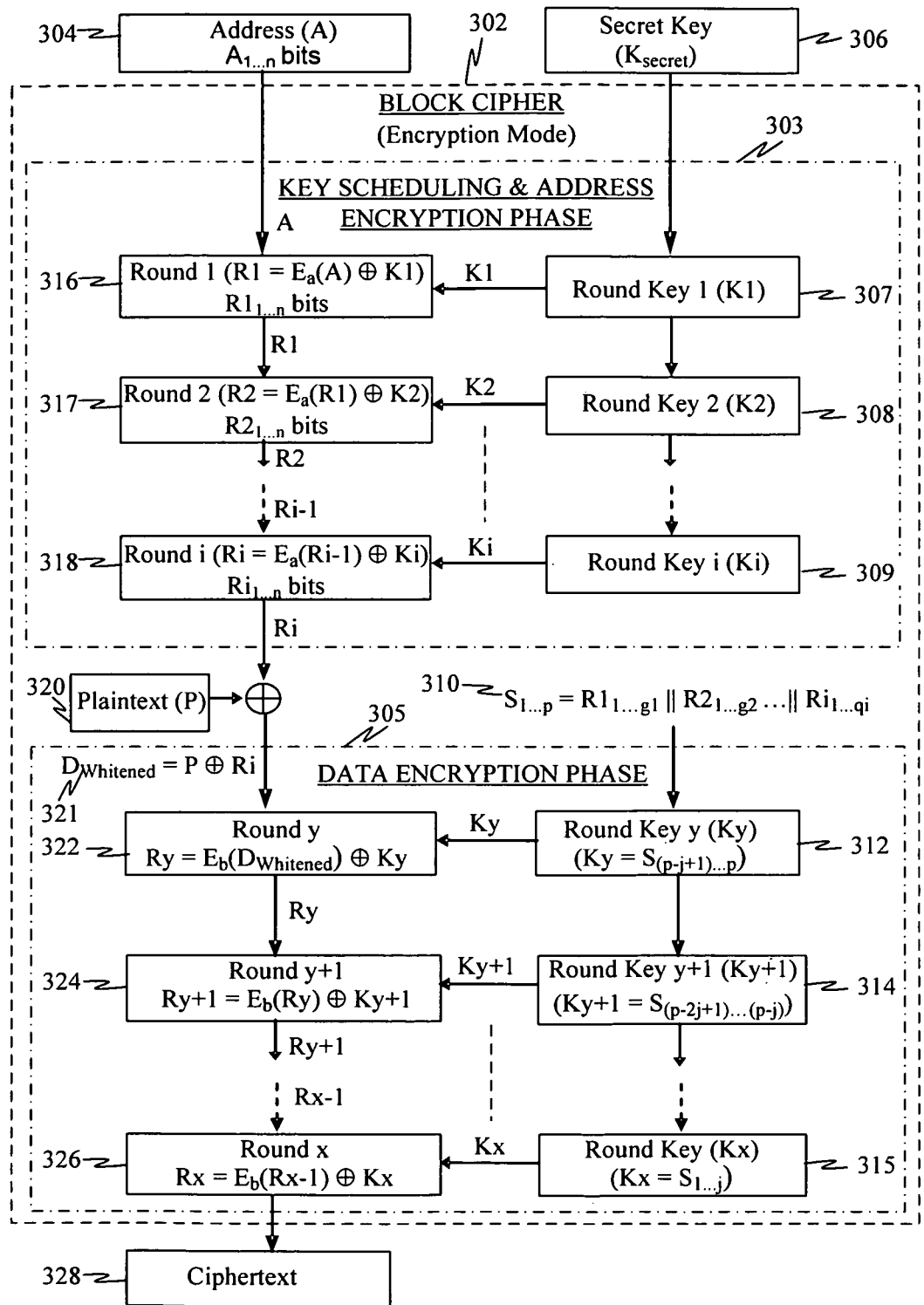
FIG. 3 is a block diagram illustrating an example of a block cipher configured to encrypt data to be stored in memory.

FIG. 3 is a block diagram illustrating an example of a block cipher configured to encrypt data to be stored in memory. In this process, the memory address A 304 may be available prior to the data block (i.e., Plaintext 320) to be stored is available. An iterated block cipher 302 may be employed to encrypt the data (Plaintext 320) as it is stored into memory. For example, a CPU may encrypt the data prior to sending it to a memory device for storage. In this example, the block cipher 302 may include a Key Scheduling and Address Encryption Phase 303 and a Data Encryption Phase 305.

In the Key Scheduling and Address Encryption Phase 303, a number of rounds of the iterated block cipher 302 are pre-processed using the memory address A 304 and a secret key $K_{secret}$ 306 for the block cipher. For instance, a plurality of round keys K1 307, K2 308 and Ki 309, for corresponding address encryption rounds 316, 317, and 318 of the block cipher 302, are generated based the secret key $K_{secret}$ 306 before the actual plaintext data block P 320 is available. Each round key K1 307, K2 308 and Ki 309 may be derived based on a previous round key (e.g., K1 is based on $K_{secret}$, K2 is based on K1, and so on). According to one example, the secret key 306 may be w-bits long and each round key K1, K2, and Ki is n-bits long, where n<w. Each round key K1, K2, and Ki is generated by taking a contiguous n bits from the secret key, where the secret key 306 is considered to wrap around at the end. Each round key K1, K2, and Ki may use a different group of contiguous bit sequences of the secret key 306.

The plurality of address encryption rounds 316, 317, and 318 of the block cipher 302 may be generated based on the memory address 304 and the corresponding round keys K1 307, K2 308 and Ki 309. For example, Round 1 316 transforms all or part of the memory address A 304 using a first linear and/or nonlinear function $E_a$ and is further transformed based on an invertible operation (e.g., modular addition/subtraction, a bitwise XOR operation, etc.) with the key K1 (e.g., R1=$E_a$(A)⊕K1). Similarly, Round 2 317 transforms the result R1 of Round 1 316 using the first linear and/or nonlinear function $E_a$ and further transforms the result based on an invertible operation (e.g., bitwise XOR operation) with the corresponding key K2 (e.g., R2=$E_a$(R1)⊕K2). This process may be repeated multiple times to diffuse the effects of each transformation operation to the entire block. For instance, Round i 318 transforms the result Ri−1 of a previous round using the first linear and/or nonlinear function $E_a$ and further transforms the result based on an invertible operation (e.g., bitwise XOR operation, etc.) with the corresponding key Ki (e.g., Ri=$E_a$(Ri−1)⊕Ki). Note that, the first block cipher rounds 303 (memory address encryption phase) may be performed (at least partially) even before the data is available for encryption in the data encryption phase 305. By partially processing (or pre-processing) the block cipher before the plaintext data block P 320 is available, latency (i.e., delay) in the block cipher may be reduced.

Additionally, during the Key Scheduling Phase 303, the keys 312, 314, and 315 for the Data Encryption Phase 305 may be generated to save time. The Data Encryption Phase 305 keys Ky, Ky+1, and Kx may be generated based on the result of each cipher round result R1, R2, Ri of the Address Encryption Phase 303. In one example, the round results R1, R2, and Ri may be n bits long (where n is a positive integer) and a number of bits g from at least a plurality of these rounds are used to generate the Data Encryption Phase keys Ky, Ky+1, and Kx, where g is an integer number less than n. For instance, a set of bits S 310 may be obtained by concatenating (symbol ‖) the extracted bits from the various round results R1, R2, Ri such that $S_{1\ldots p}=R1_{1\ldots g1} \| R2_{1\ldots g2} \cdots \| Ri_{1\ldots gi}$, where p is an integer value depicting the total number of bits in the bits set S 310. Note that, in some implementations, the number of bits g1, g2, . . . , gi, for each round may be the same, while in other implementations the number of bits g1, g2, . . . , gi may be different. During the Key Scheduling Phase 303, the Data Encryption Phase keys Ky, Ky+1, and Kx may be generated by extracting a segment of bits from the bit set S 310 for each key. In one example, the bits corresponding to the later cipher rounds of the Key Scheduling and Address Encryption Phase 303 may be used for the earlier keys in the Data Encryption Phase 305. For instance, key Ky 312 may be taken from bits $S_{(p-j+1)...p}$ of the bit set S 310 that, in this example, correspond to a subset of the bits from $Ri_{1...g}$, where j<g (for g=g1, g2, ..., gi). Similarly, key Ky+1 314 may be equal to bits $S_{(p-2j+1)...(p-j)}$ of the bit set S 310 and key Kx may be equal to bits $S_{1...j}$ of the bit set S 310. In some implementations, where j<g, the number of rounds in the Key Scheduling Phase 303 may be less than the number of rounds in the Data Phase 305. For instance, where the round results R1, R2, and Ri are sixty-three (63) bits long (i.e., n=63), forty-five (45) bits (i.e., g=45) from each round may be extracted to be used for the set of bits S 310 and each Data Phase key Ky 312, Ky+1 314, and Kx 315 may be thirty-two (32) bits long (i.e., j=32).

In a general sense, one or more round key functions KSx may be used to generated each of the round keys K1, K2, Ki, Ky, Ky+1 . . . Kx. In one example, a first key scheduling function KS1 may be used to generate keys K1, K2, Ki (for the Address Encryption Phase) and a second key scheduling function KS2 may be used to generate keys Ky, Ky+1, Kx (for the Data Encryption Phase). For instance, the first key scheduling function KS1 may be used to generate key Ki, such that Ki=KS1($K_{secret}$, i), where "i" is the round number for the Address Encryption Phase 303, while the second key scheduling function KS2 may be used to generate key Ky+i, such that Ky+i=KS2 ($S_{1...p}$, i), where "y+i" is the round number for the Data Encryption Phase 305.

When the plaintext data block P 320 becomes available, it may be inserted into the block cipher 302 after the one or more rounds 316, 317, and 318 of the block cipher 302 have been performed (e.g., after the Key Scheduling Phase 303). The plaintext data block P 320 may be inserted into the block cipher 302 by XORing it (on a bitwise basis) with the result Ri of the last pre-processed round (e.g., Round i 318) in a process often called whitening. After the plaintext data block P 320 has been introduced, one or more rounds 322, 324 and 326 of a Data Encryption Phase 305 are performed using the corresponding round keys Ky 312, Ky+1 314, and Kx 315.

During the Data Encryption Phase 305 at a Round y 322, the whitened data block $D_{Whitened}$ 321 is transformed by a second linear and/or nonlinear function $E_b$ and is further transformed based on an invertible operation (e.g., a bitwise XOR operation) with the corresponding round key Ky (e.g., Ry=$E_b(D_{Whitened})\oplus$Ky). Similarly, at Round y+1 324 transforms the result Ry of Round y 322 using the second linear and/or nonlinear function $E_b$ and further transforms the result based on an invertible operation (e.g., modular addition/subtraction, a bitwise XOR operation, etc.) with the corresponding key Ky+1 (e.g., Ry+1=$E_b$(Ry)$\oplus$Ky+1). This process may be repeated multiple times to diffuse the effects of each transformation operation to the entire block For instance, Round x 326 transforms the result Rx-1 of a previous round using the second linear and/or nonlinear function $E_b$ and further transforms the result based on an invertible operation (e.g., a bitwise XOR operation, etc.) with the corresponding key Kx (e.g., Rx=$E_b$(Rx-1)$\oplus$Kx) to obtain the ciphertext 328.

In various implementations, the number of rounds of the Key Scheduling and Address Encryption Phase 303 and the Data Encryption Phase 305 may be the same or different. The number of rounds during the Data Encryption Phase 305 may be selected to reduce the latency of the block cipher 302 while providing sufficient diffusion to the plaintext data block P 320 is introduced to reduce the latency of the block cipher 302.

Figure 4:
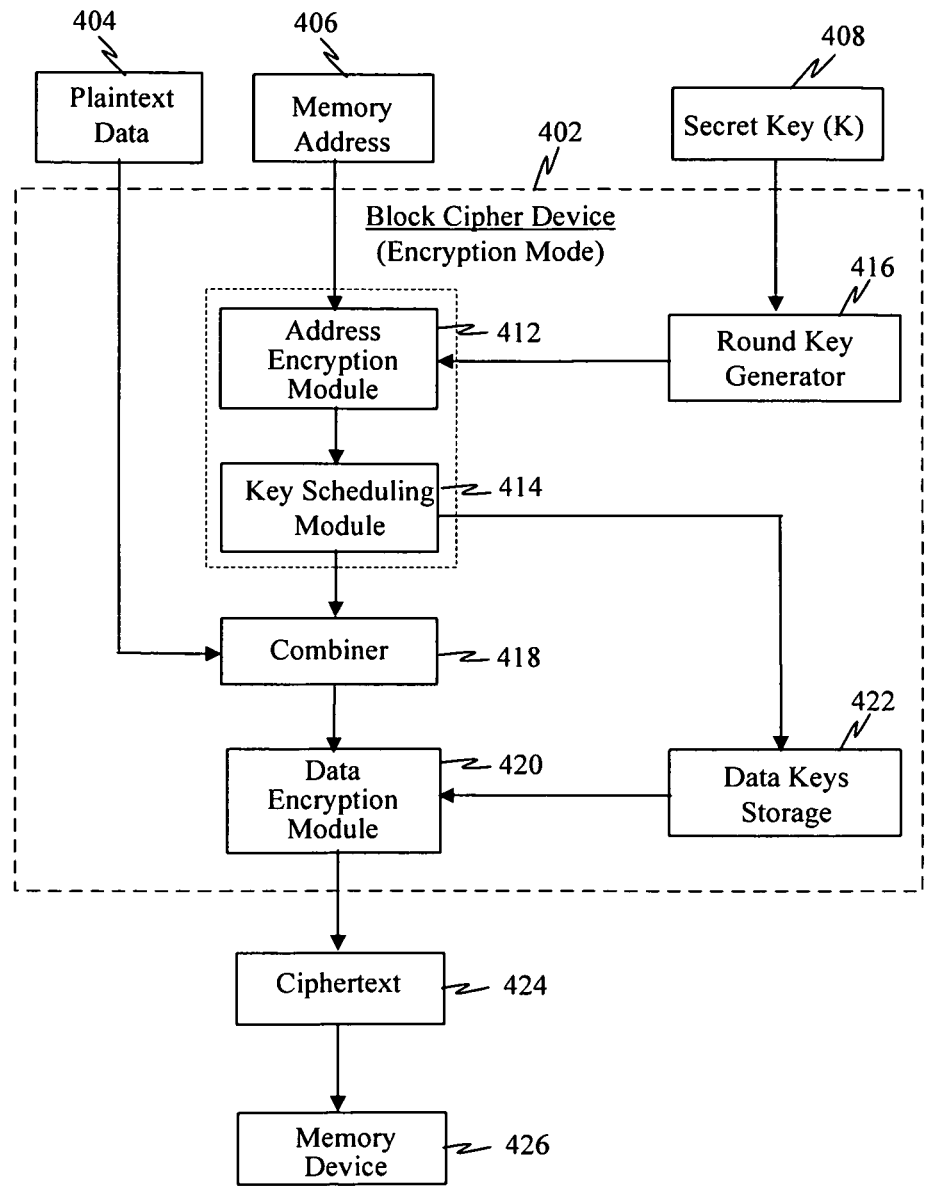
FIG. 4 is a block diagram illustrating the functional components of a block cipher device configured to encrypt plaintext data.

FIG. 4 is a block diagram illustrating the functional components of a block cipher device configured to encrypt plaintext data. The block cipher device 402 may encrypt plaintext data 404 based on the memory address 406 to which it is to be stored and a secret key 408. The block cipher device 402 may include an address encryption module 412 that transforms and/or encrypts the memory address 406 according to a transform or encryption function and a key provided by the round key generator 416. The round key generator 416 may be configured to generate one or more round keys based on a secret key 408. A key scheduling module 414 may also generate one or more data keys based on the results of the address encryption module 412. The one or more data keys may be stored in a data keys storage 422 module. The address encryption and data scheduling functions may be iteratively performed in multiple rounds using a different round key from the round key generator 416 in each round. After a plurality of rounds, a combiner 418 may combine the plaintext data 404 with the last results of the address encryption module 412 using an invertible operation (e.g., modular addition/subtraction, bitwise XOR, etc.). The resulting whitened plaintext data may then be iteratively transformed or encrypted by a data encryption module 420 in one or more rounds using the stored data keys from the data keys storage 422 and a transform or encryption function to produce ciphertext 424. The ciphertext 424 may then be stored in a memory device 426 at the memory address 406.

According to one example, the block cipher device may be implemented in a system with byte addressable memory. For instance, the word size of a CPU implementing the block cipher may be 32 bits and the memory address may also be 32 bits. As previously noted, the block cipher device may be configured to perform an address encryption phase and a data encryption phase.

Figure 5:
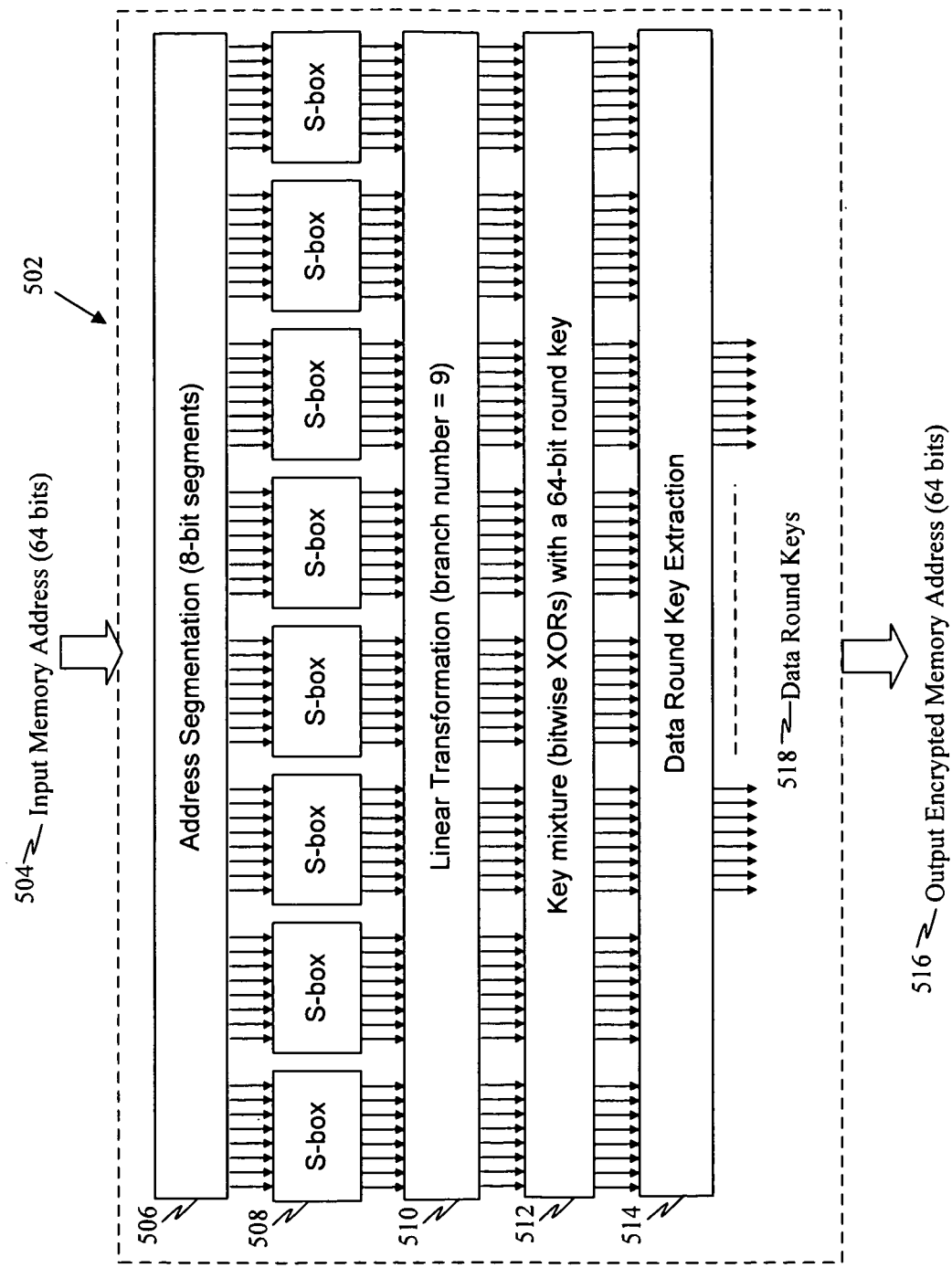
FIG. 5 is a block diagram illustrating one example of a memory address encryption or transform module.

FIG. 5 is a block diagram illustrating one example of a memory address encryption or transform module. During the address encryption phase 502, an input memory address (padded to 64 bits) may be transformed by running a plurality of Substitution-Permutation cipher rounds. Optionally, the input memory address 504 may first be whitened by XORing with a round key. An address segmentation module 506 may divide the 64-bit memory address 504 into eight 8-bit segments. Each 8-bit segment then passes through an 8×8 substitution box 508 (e.g., an Advance Encryption Standard (AES) 8×8 substitution box). The results from each substitution box 508 are then passed to a transformation module 510 that performs a linear transformation on the entire set of segments. The linear transformation may be implemented, for example, with a matrix multiplication Y=CX, where X is a memory address vector, C is a transformation matrix, and Y is the output vector. In one example, the transformation matrix C may be an 8×8 matrix over $GF(2^8)$ as a Maximum Distance Separable (MDS) mapping with branch number 9. The matrix C may be MDS if and only if all its sub-matrices are nonsingular. Many diffusion layers in block ciphers (e.g., SHARK and Khazad) may meet this requirement. A key mixture module 512 then mixes the transformed memory address with a 64-bit round key (e.g., using bitwise XORing). For each cipher round, a data round key extraction module 514 may then extract a plurality of bits from the interim encrypted memory address to obtain one or more data round keys 518 that may be used in a subsequent data encryption process. A plurality of these cipher rounds (e.g., comprising segmentation 506, S-box layer 508, transformation 510, and key mixture 512) may be performed with data round key extraction 514 being performed at the end of each cipher round.

Figure 6:
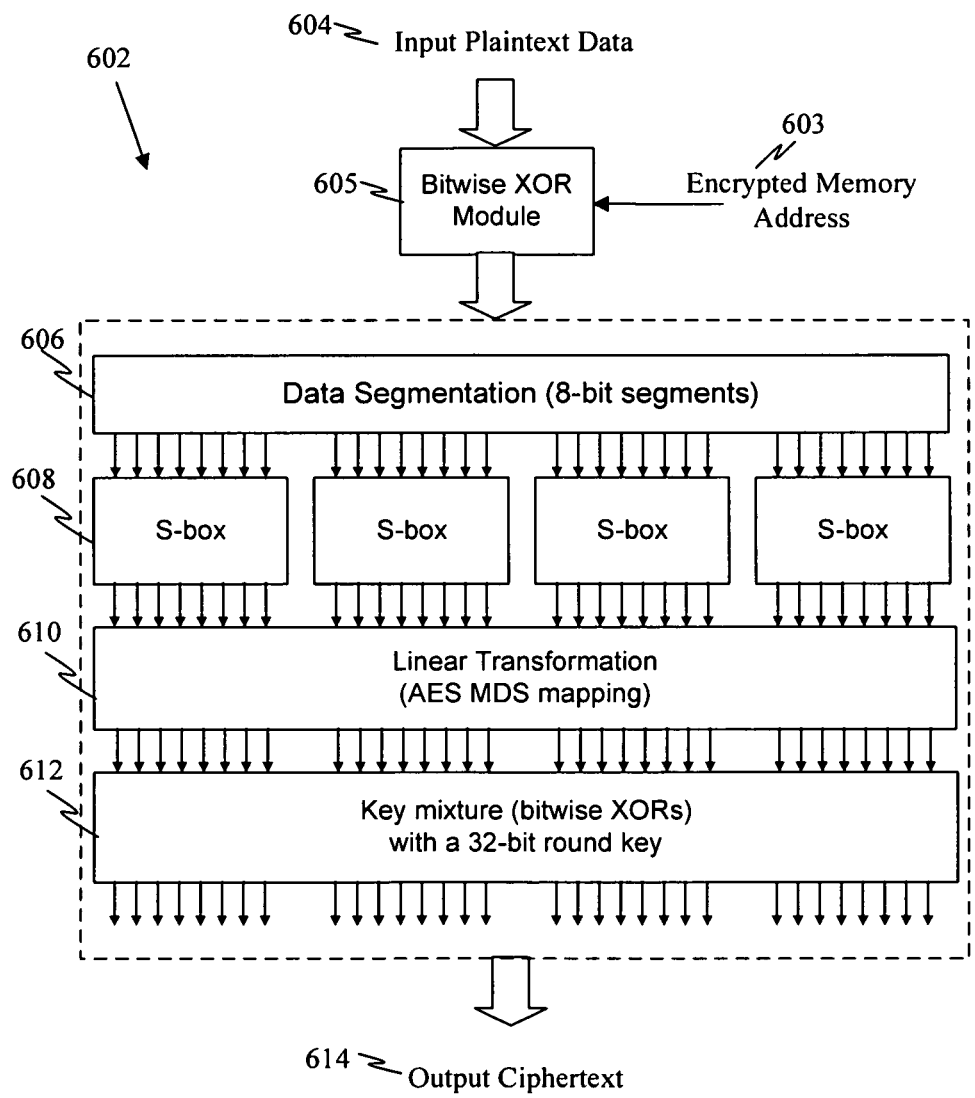
FIG. 6 is a block diagram illustrating one example of a plaintext data encryption or transform module.

FIG. 6 is a block diagram illustrating one example of a plaintext data encryption or transform module. During the data encryption phase 602, the plaintext data 604 may first be whitened by a Bitwise XORing Module 605 with the encrypted memory address 603 from an address encryption phase. The encrypted memory address 603 may correspond to a memory address to which the encrypted plaintext data is to be stored. For example, if the plaintext data 604 is processed in 32-bit blocks, it may be XORed with 32 bits of the output from the memory address phase. The round keys for the data encryption phase may be derived from the memory address encryption phase. A data segmentation module 606 divides or splits the plaintext data 604 into four 8-bit segments. Each 8-bit data segment is passed through a substitution box 608 (e.g., an AES 8×8 substitution box). The results from the substitution boxes 608 are then transformed by a linear transformation module 610 (e.g., AES MDS mapping). A key mixture module 612 may then bitwise XOR the resulting transformed plaintext data with a corresponding round key. This process may be repeated multiple times using a different round key for each round. The result of the last cipher round of the data encryption phase 602 is the output ciphertext 614 that can be stored in the memory address used during the corresponding address encryption phase.

Figure 7:
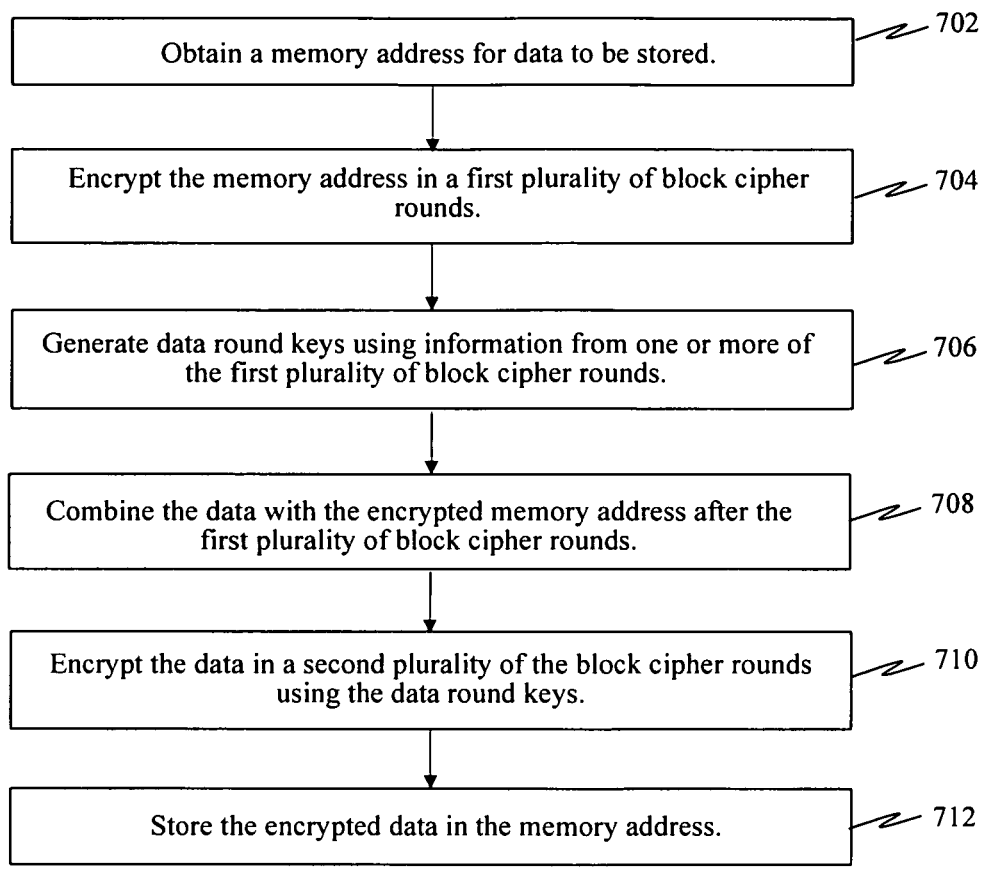
FIG. 7 illustrates a block cipher data encryption method that uses the memory address where the data is to be stored to encrypt the data.

FIG. 7 illustrates a block cipher data encryption method that uses the memory address where the data is to be stored to encrypt the data. In this method, a first set of cipher rounds is executed to encrypt the memory address and generate data round keys before the data is actually ready or available for storage. Then a second set of cipher rounds is executed to encrypt the data.

A processor may obtain a memory address for data to be stored 702 prior to the data actually being received. The memory address may be encrypted in a first plurality of block cipher rounds 704. Such memory address encryption may include: (a) segmenting the memory address into a plurality of memory address segments, (b) performing bit substitution on the different memory address segments, (c) transforming the memory address according to a first transform function, and/or (d) mixing the transformed memory address with a round key. The memory address may be iteratively encrypted over the first plurality of block cipher rounds.

Data round keys may be generated using information from one or more of the first plurality of block cipher rounds 706. The data round keys may be generated by: (a) extracting a plurality of bits from the encrypted memory address for at least some of the first plurality of block cipher rounds, (b) selecting the data round keys from segments of the extracted plurality of bits, and/or (c) concatenating the extracted plurality of bits into a string from which the data round keys are selected.

The data to be stored may then be combined with the encrypted memory address after the first plurality of block cipher rounds 708. In one example, the data may be combined with the encrypted memory address by an invertible operation (e.g., a bitwise XOR operation). The data may then be encrypted in a second plurality of block cipher rounds using the data round keys 710. Such data encryption may include: (a) segmenting the data into a plurality of data segments, (b) performing bit substitution on the different data segments, (c) transforming the data according to a second transform function, and/or (d) mixing the transformed data with one or more of the data round keys. The data may be iteratively encrypted over the second plurality of block cipher rounds. In one example, the data round keys used for earlier rounds of the second plurality of block cipher rounds are generated using bits from the encrypted memory address from later rounds of the first plurality of block cipher rounds. The second plurality of block cipher rounds may be greater than the first plurality of block cipher rounds. The encrypted data may then be stored in the memory address 712.

Efficient Decryption Using Block Cipher

Figure 8:
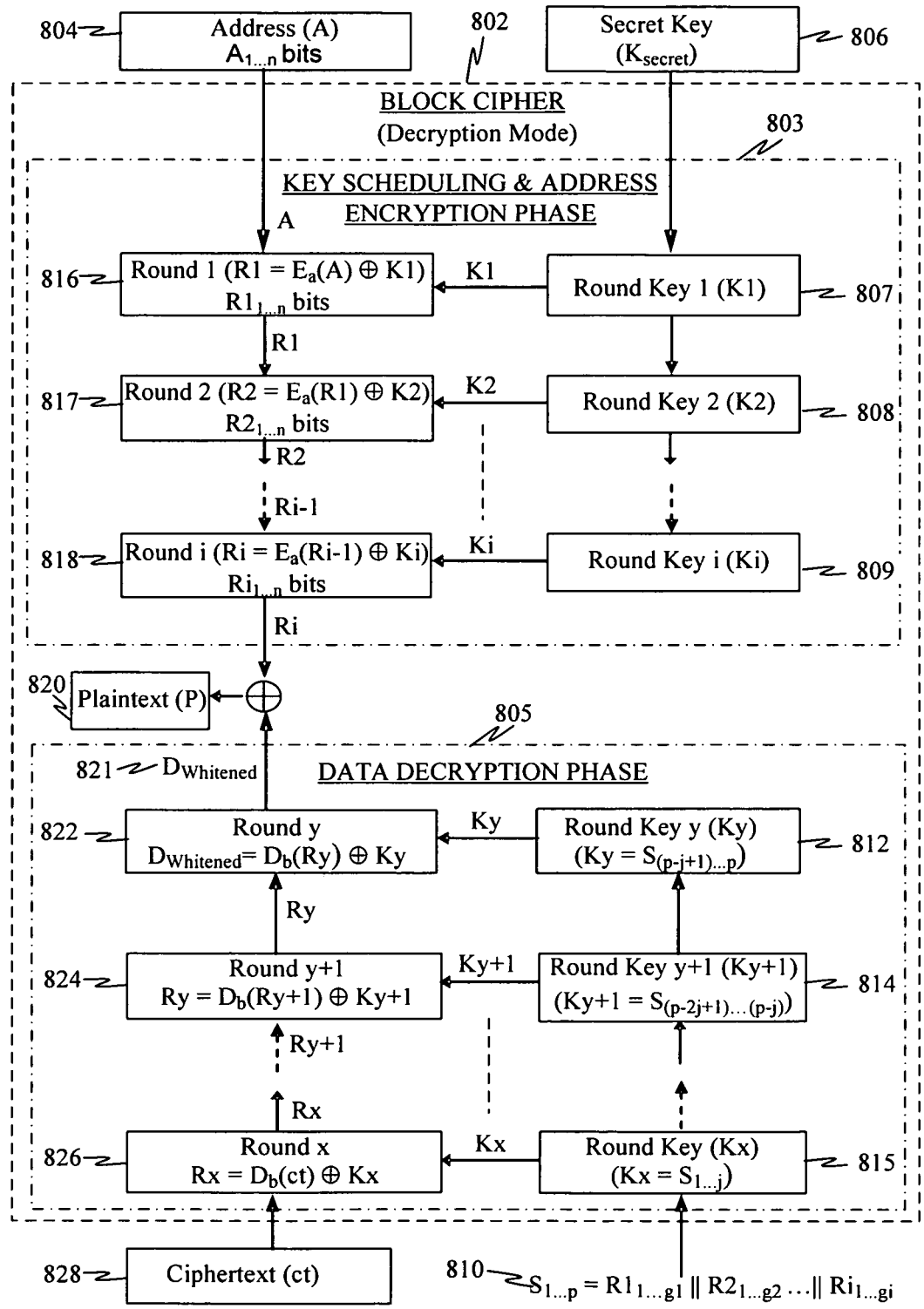
FIG. 8 is a block diagram illustrating the processing of a block cipher to decrypt data read from a memory address.

FIG. 8 is a block diagram illustrating the processing of a block cipher to decrypt data read from a memory address. The data may have been previously encrypted using the method illustrated in FIGS. 1, and 3-7, for example. In decryption mode, instead of running the whole block cipher backwards as is done in conventional decryption methods, a second phase 805 of the block cipher 802 is processed backwards starting with the ciphertext 828 while a first phase 803 is concurrently processed forward. Generally, a first set of block cipher rounds 803 is processed in parallel with a second set of block cipher rounds 805, thereby reducing the latency of the block cipher 802. That is, the first block cipher rounds 803 (memory address encryption phase) may be performed (at least partially) even before the encrypted data is available or retrieved for processing by the second block cipher rounds 805. In a key scheduling and address encryption phase 803, a memory address 804 (from which ciphertext data 828 is being retrieved) is encrypted in a plurality of cipher rounds. Meanwhile, in a data decryption phase 805, the ciphertext data 828 is decrypted in a plurality of cipher rounds using data round keys generated in the key scheduling phase 803. The results from these to phases 803 and 805 are then combined (e.g., XORed) to produce the original plaintext 820.

In the Key Scheduling and Address Encryption phase 803, the memory address 804 from which the ciphertext data 828 is being retrieved is encrypted. A number of rounds of the iterated block cipher 802 are processed using the memory address A 804 and a secret key $K_{secret}$ 806 for the block cipher 802. For instance, a plurality of round keys K1 807, K2 808 and Ki 809, for corresponding address encryption rounds 816, 817, and 818 of the block cipher 802, are generated based the secret key $K_{secret}$ 806. Each round key K1 807, K2 808 and Ki 809 may be derived based on a previous round key (e.g., K1 is based on $K_{secret}$, K2 is based on K1, and so on). According to one example, the secret key 806 may be w-bits long and each round key K1, K2, and Ki is n-bits long, where n<w. Each round key K1, K2, and Ki is generated by taking a contiguous n bits from the secret key 806, where the secret key 806 is considered to wrap around at the end. Each round key K1, K2, and Ki may use a different group of contiguous bit sequences of the secret key 806.

The plurality of address encryption rounds 816, 817, and 818 of the block cipher 802 are generated based on the memory address 804 and the corresponding round keys K1 807, K2 808 and Ki 809. For example, Round 1 816 transforms all or part of the memory address A 804 using a first linear and/or nonlinear function $E_a$ and is further transformed based on an invertible operation (e.g., modular addition/subtraction, bitwise XOR, etc.) with the key K1 (e.g., $R1=E_a(A) \oplus K1$). Similarly, Round 2 817 transforms the result R1 of Round 1 816 using the first linear and/or nonlinear function $E_a$ and further transforms the result based on a bitwise XOR with the corresponding key K2 (e.g., $R2=E_a(R1) \oplus K2$). This process may be repeated multiple times to diffuse the effects of each transformation operation to the entire block. For instance, Round i 818 transforms the result Ri−1 of a previous round using the first linear and/or nonlinear function $E_a$ and further transforms the result based on a bitwise XOR with the corresponding key Ki (e.g., $Ri=E_a(Ri-1) \oplus Ki$).

Additionally, during the Key Scheduling Phase 803, the keys 812, 814, and 815 for the Data Decryption Phase 805 may be generated to save time. The Data Decryption Phase 805 keys Ky, Ky+1, and Kx may be generated based on the Key Scheduling Phase keys K1, K2, and Ki. In one example, the cipher round results R1, R2, and Ri may be n bits long (where n is a positive integer) and a number of bits g from each of these keys are used to generate the Data Phase keys Ky, Ky+1, and Kx, where g is an integer number less than n. For instance, a set of bits S 810 may be obtained by concatenating (symbol ||) the extracted bits from the various round results R1, R2, Ri such that $S_{1...p} = R1_{1...g1} \| R2_{1...g2} \| Ri_{1...gi}$, where p is an integer value depicting the total number of bits in the bits set S 810. Note that, in some implementations, the number of bits g1, g2, . . . , gi, for each round may be the same, while in other implementations the number of bits g1, g2, . . . , gi may be different. During the Key Scheduling Phase 803, the Data Encryption Phase keys Ky, Ky+1, and Kx may be generated by extracting a segment of bits from the bit set S 810 for each key.

In one example, the bits corresponding to the early rounds of the Key Scheduling Phase 803 may be used for the earlier cipher round keys in the Data Decryption Phase 805. This allows executing the Data Decryption Phase 805 concurrent or in parallel with the Address Encryption Phase 803. For instance, key Kx 815 may be equal to bits $S_{1...j}$ of the bit set S 810 which correspond to some of the bits extracted from the first cipher round $R1_{1...g1}$ 816. Consequently, as soon as the R1 result is generated, the decryption key Kx 815 can be obtained. Similarly, key Ky+1 314 may be equal to bits $S_{(p-2j+1)...(p-j)}$ of the bit set S 310. Likewise, key Ky 814 may be taken from bits $S_{(p-j+1)...p}$ of the bit set S 810 that, in this example, correspond to a subset of the bits from $Ri_{1...gi}$, where j<g. In some implementations, where j<g, the number of cipher rounds in the Key Scheduling Phase 803 may be less than the number of rounds in the Data Decryption Phase 805. For instance, where the round results R1, R2, and Ri are sixty-three (63) bits long (i.e., n=63), forty-five (45) bits (i.e., g=45) from each round may be extracted to be used for the set of bits S 310 and each Data Decryption Phase key Kx 815, Ky+1 814, and Ky 812, may be thirty-two (32) bits long (i.e., j=32).

In a general sense, one or more round key functions KSx may be used to generated each of the round keys K1, K2, Ki, Ky, Ky+1 . . . Kx. In one example, a first key scheduling function KS1 may be used to generate keys K1, K2, Ki (for the Address Encryption Phase) and a second key scheduling function KS2 may be used to generate keys Ky, Ky+1, Kx (for the Data Decryption Phase). For instance, the first key scheduling function KS1 may be used to generate key Ki, such that Ki=KS1 ($K_{secret}$, i), where "i" is the round number for the Address Encryption Phase 803, while the second key scheduling function KS2 may be used to generate key Ky+i, such that Ky+i=KS2 ($S_{1...p}$, i), where "y+i" is the round number for the Data Decryption Phase 805.

During the Data Decryption Phase, the ciphertext data (ct) 828 is decrypted using the keys Kx, Ky+1 and Ky over multiple rounds. For instance, Round x 826 transforms the result ciphertext (ct) 828 using the a linear and/or nonlinear decryption function $D_b$ and further transforms the result based on an operation (e.g., invertible modular addition/subtraction, bitwise XOR, etc.) with the corresponding key Kx (e.g., Rx=$D_b$(ct) ⊕ Kx) to obtain the result Rx. This decryption process may be repeated multiple times to undo the encryption of the stored data. For instance, at Round y+1 824 transforms the result Ry+1 from a previous round using the linear and/or nonlinear decryption function $D_b$ and further transforms the result based on a bitwise XOR with the corresponding key Ky+1 (e.g., Ry=$D_b$(Ry+1)⊕Ky+1) to obtain the output Ry. At a Round y 822, the result Ry is transformed by the linear and/or nonlinear decryption function $D_b$ and is further transformed based on a bitwise XOR with the corresponding round key Ky (e.g., $D_{Whitened}$=$D_b$(Ry)⊕Ky) to obtained the whitened data block $D_{Whitened}$ 821. The whitened data block $D_{Whitened}$ is then combined with the result Ri (e.g., encrypted address) from the Address Encryption Phase 803 using an invertible operation (e.g., (e.g., modular addition/subtraction, bitwise XOR, etc.) to obtain the plaintext data block P 820.

In various implementations, the number of rounds of the Key Scheduling and Address Encryption Phase 803 and the Data Decryption Phase 805 may be the same or different. The decryption function $D_b$ used in the Data Decryption Phase 805 may be selected to undo the encryption by the encryption function $E_b$ used in the Data Encryption Phase 305 (FIG. 3). For example, the decryption function $D_b$ may be an inverse transform of the encryption function $E_b$ transform.

Figure 9:
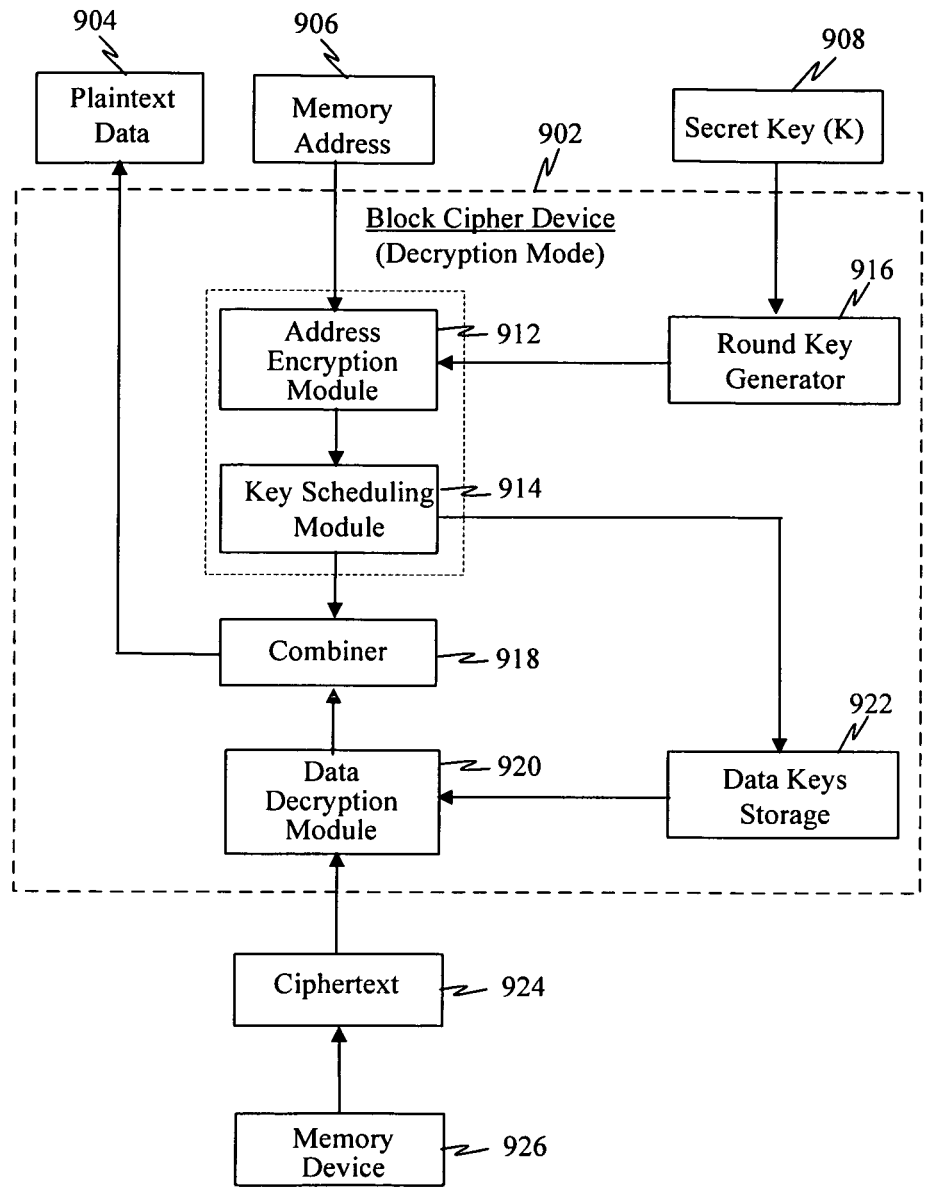
FIG. 9 is a block diagram illustrating the functional components of a block cipher device configured to decrypt ciphertext data.

FIG. 9 is a block diagram illustrating the functional components of a block cipher device configured to decrypt ciphertext data. The block cipher device 902 may include an address encryption module 912 that transforms and/or encrypts the memory address 906 according to a transform or encryption function and a key provided by the round key generator 916. Note that, the memory address 906 may be the location from which the ciphertext data 924 is being retrieved from a memory device 926. A round key generator 916 may be configured to generate one or more round keys based on a secret key 908. A key scheduling module 914 may also generate one or more data keys based on the results of the address transform module 912. The one or more data keys may be stored in a data keys storage 922 module. The address encryption and data scheduling functions may be iteratively performed in multiple rounds using a different round key from the round key generator 916 in each round. Concurrently or in parallel, the ciphertext data 924 may be iteratively transformed or decrypted by a data decryption module 920 in one or more rounds using the stored data keys from the data keys storage 922 and/or a transform or decryption function to produce whitened plaintext data. After a plurality of decryption rounds, a combiner 918 may combine the last result of the data decryption module 920 (whitened plaintext data) with the last results of the address encryption module 912 using an invertible operation (e.g., modular addition/subtraction, bitwise XOR, etc.) to obtain the plaintext data 904.

Note that, in the address encryption module 912, the memory address may be encrypted as done by the block cipher device in encryption mode. For example, the address encryption module 912 may include a plurality of Substitution-Permutation cipher rounds as illustrated in FIG. 5.

Figure 10:
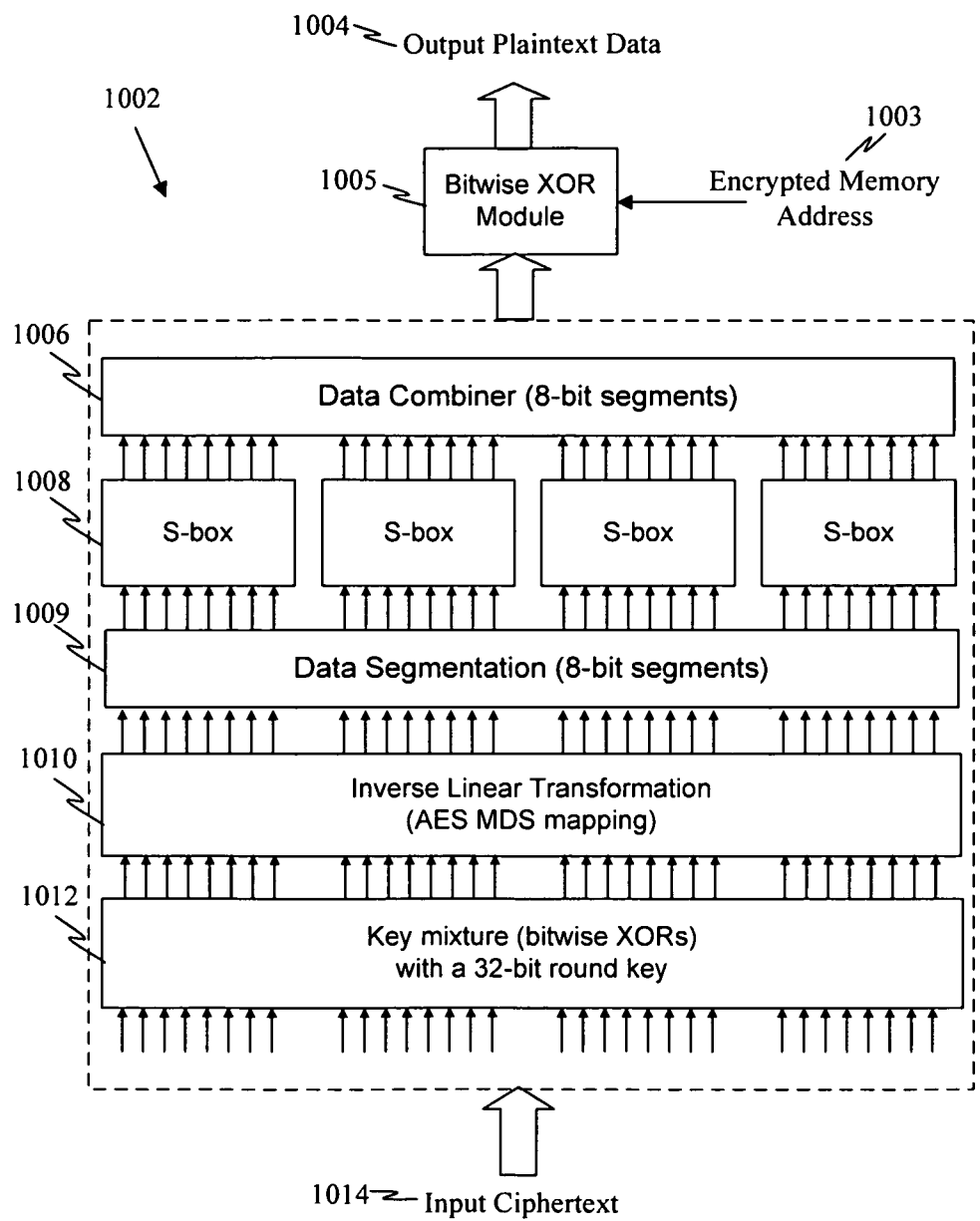
FIG. 10 is a block diagram illustrating one example of a ciphertext data decryption or inverse transform module.

FIG. 10 is a block diagram illustrating one example of a ciphertext data decryption or inverse transform module. For example, this ciphertext data decryption or inverse transform module 1002 may be included as part of the data decryption module 920 (FIG. 9). A key mixture module 1012 may perform a bitwise XOR operation between input ciphertext 1014 and a corresponding cipher round key. The cipher round keys for the data decryption phase may be derived from the memory address encryption phase. The result from the key mixture module 1012 is then transformed by an inverse linear transformation module 1010 (e.g., AES MDS mapping). The result from the inverse linear transformation module 1010 is then segmented into a plurality of 8-bit data segments by a data segmentation module 1009. The plurality of 8-bit data segments are then passed through substitution boxes 1008 (e.g., an AES 8×8 substitution box). The substitution boxes 1008 may reverse the substitution boxes of the data encryption substitution boxes 608 (FIG. 6).

A data combiner module 1006 may combined the resulting output from the substitution boxes 1008 to produce the output whitened plaintext data. This process may be repeated multiple times using a different round key for each round. The result of the last cipher round of the data encryption phase 1002 is the whitened plaintext data. The whitened plaintext data is then combined with an encrypted memory address 1003 by a Bitwise XOR Module 1005 to produce the output plaintext data 1004. Note that the encrypted memory address 1003 may correspond to the memory address from which the input ciphertext data 1014 was retrieved.

Figure 11:
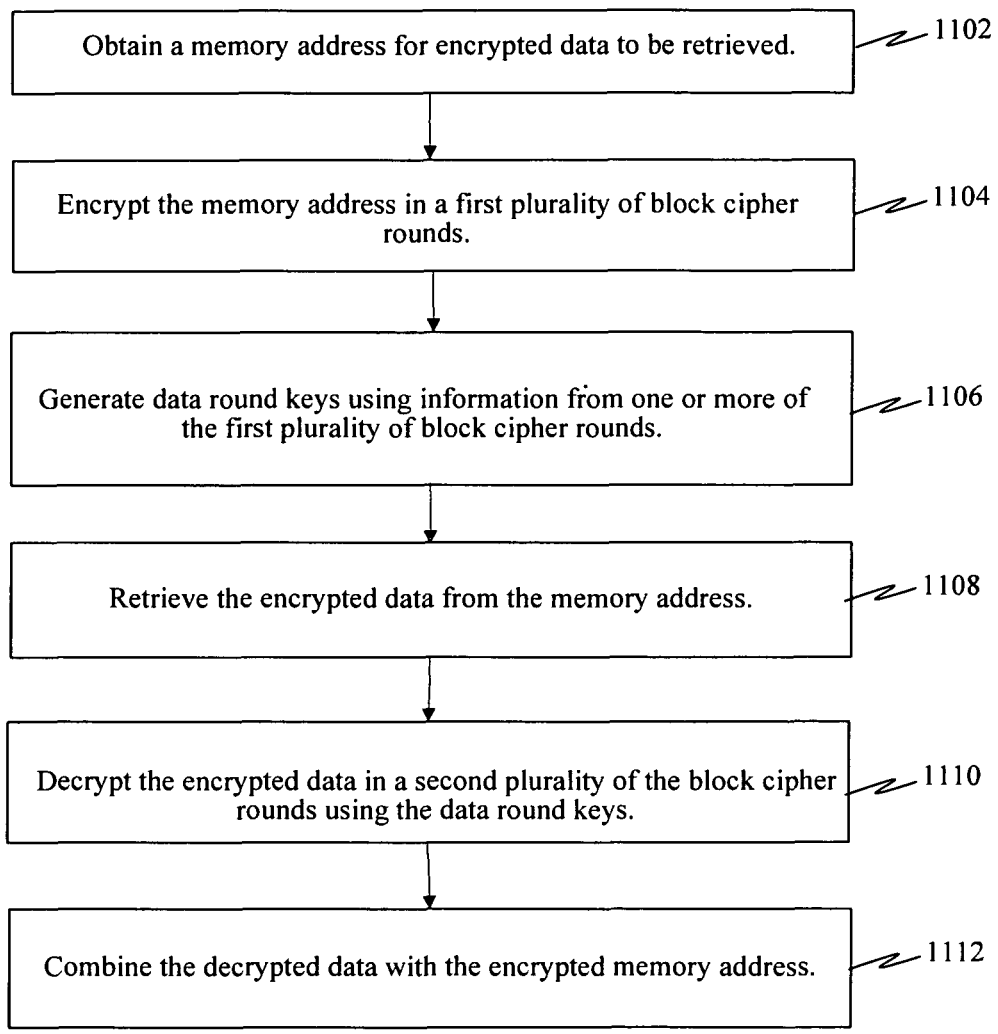
FIG. 11 illustrates a method for decrypting encrypted data by using a block cipher that concurrently encrypts a memory address while decrypting the encrypted data to reduce latency of the block cipher.

FIG. 11 illustrates a method for decrypting encrypted data by using a block cipher that concurrently encrypts a memory address while decrypting the encrypted data to reduce latency of the block cipher. A memory address for encrypted data to be retrieved is obtained 1102. The memory address is encrypted in a first plurality of block cipher rounds to obtain an encrypted memory address 1104. Such address encryption may utilize a plurality of round keys generated based on a secret key. Additionally, encrypting the memory address may include (a) mixing the transformed memory address with a round key, (b) transforming the memory address according to a first transform function, (c) segmenting the memory address, and/or (d) performing bit substitution on the different memory address segments.

Data round keys may also be generated using information from one or more of the first plurality of block cipher rounds 1106. That is, the partially encrypted memory address from at least some of the first plurality of the block cipher rounds may be used to generate the data round keys. For instance, generating the data round keys may include (a) extracting a plurality of bits from the encrypted memory address for at least some of the first plurality of block cipher rounds, (b) selecting the data round keys from segments of the extracted plurality of bits, and/or (c) concatenating the extracted plurality of bits into a string from which the data round keys are selected.

The encrypted data may be retrieved from the memory address 1108 and decrypted in a second plurality of the block cipher rounds using the data round keys to obtain partially decrypted data 1110. The data round keys used for earlier rounds of the second plurality of block cipher rounds may be generated using bits from the encrypted memory address from the earlier rounds of the first plurality of block cipher rounds. In one example, decrypting the encrypted data may include (a) mixing the transformed encrypted data with one or more of the data round keys, (b) transforming the encrypted data according to a second inverse transform function, (c) segmenting the encrypted data into a plurality of encrypted data segments; and/or (d) performing bit substitution on the different encrypted data segments. The partially decrypted data may be combined with the encrypted memory address to obtain a fully decrypted data 1112. In one example, the partially decrypted data is combined with the encrypted memory address by an invertible operation (e.g., a bitwise XOR operation).

The first plurality of block cipher rounds may be concurrently executed with the second plurality of block cipher rounds, thereby expediting the decryption process. Also, the second plurality of block cipher rounds may be greater than the first plurality of block cipher rounds.

Efficient Key Scheduling for Block Cipher

According to one feature, key scheduling may be performed so as to efficiently encrypt and decrypt data. During the address encryption phase, a plurality of cipher rounds may be iteratively executed to encrypt a memory address, where the memory address is the location to where data is to be stored or from which the data is to be retrieved. Each cipher round produces an encrypted memory address. The encrypted memory address produced by one or more of these cipher rounds may be used (fully or partially) to generate the data encryption/decryption phase round keys.

Figure 12:
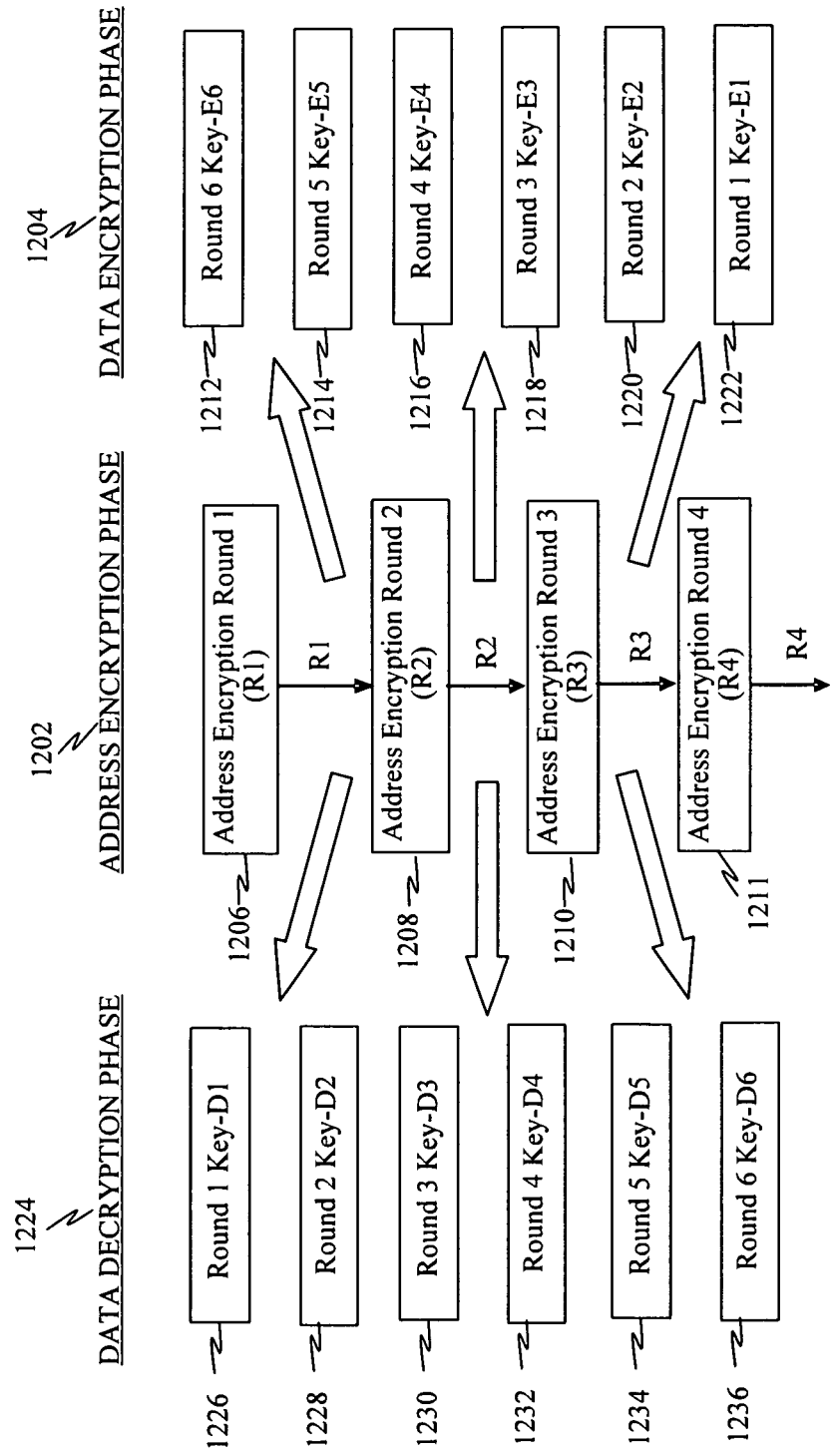
FIG. 12 is a block diagram illustrating an example of how round keys for data encryption and decryption rounds may be generated based on the results from address encryption rounds of a block cipher.

FIG. 12 is a block diagram illustrating an example of how round keys for data encryption and decryption rounds may be generated based on the results from address encryption rounds of a block cipher. When the block cipher is encrypting data, the data round keys are generated based on the results of the address encryption phase 1202. The results of the early rounds (e.g., R1 1206, R2 1208 . . . ) of the address encryption phase 1202 are used to generate the later data encryption round keys (Key-E6 1212, Key-E5 1214 . . . ) to be used in the data encryption phase 1204. Similarly, the results of the later rounds (e.g., R3 1210 . . . ) of the address encryption phase 1202 are used to generate the early data encryption round keys (Key-E1 1222, Key-E2 1220 . . . ).

Similarly, when the block cipher is decrypting data, the data round keys are generated based on the results of the address encryption phase 1202. The results of the early rounds (e.g., R1 1206, R2 1208 . . . ) of the address encryption phase 1202 are used to generate the early data encryption round keys (Key-D1 1226, Key-D2 1228 . . . ) to be used in the data decryption phase 1224. Similarly, the results of the later rounds (e.g., R3 1210 . . . ) of the address encryption phase 1202 are used to generate the later data decryption round keys (Key-D6 1236, Key-D5 1234 . . . ). Consequently, this allows the data decryption phase 1224 to be executed concurrently (e.g., overlapping time periods or in parallel) with the address encryption phase 1202, thus more efficiently decrypting data.

Note that in various implementations, the number of cipher rounds of the address encryption phase, data encryption phase 1204 and/or data decryption phase 1224 may be greater or fewer than those shown in this example. Additionally, according to one optional feature, at least some portion of the result of the last round (e.g., R4 1211) of the address encryption phase 1202 may be reserved for a whitening operation of the plaintext data. Consequently, this result of the last round (e.g., R4 1211) of the address encryption phase 1202 may not be used for data round key generation.

In some implementations, a data encryption round key (or data decryption round key) may be based on a subset of bits from one or more results (e.g., R1 1206, R2 1208, . . . ) of the address encryption phase 1202. For example, Key-E1 1222 may be based on a subset of bits from R3 1210 and Key-E2 may be based on a subset of bits from both R2 1208 and R3 1210.

Note that since the memory address is used by the block cipher to generate encryption/decryption keys for the data encryption/decryption phases 1204/1224, this means that the block cipher transformation of the plaintext/ciphertext would be different for each memory address, severely constraining the resources available to a cryptanalysis, and increasing the security of the block cipher. It should be noted that it is not necessarily the case that the early rounds need to have the same block size as the later rounds. For example, it is quite possible that the memory is to be encrypted in 32-bit blocks, while addresses might be larger than that. There is efficiency to be gained via parallelization in the first rounds.

According to one example of a block cipher, data encryption/decryption may be byte addressable memory. Specifically, the word (data block) size of processor executing the block cipher is 32 bits and the address is also 32 bits. The last 32 bits of the result from the address encryption phase may be used as a whitening key. The remaining bits from the address encryption results (e.g., encrypted memory address) may be concatenated into a set S used for data encryption round keys. A 32-bit long data encryption round key may be selected for each data encryption round n (e.g., for n=0 . . . 5) such the Key-En=bits 32*(5−n) to 32*(5−n)+31 of the set S. Conversely, a 32-bit long data decryption round key may be selected for each data decryption round n (e.g., for n=0 . . . 5) such the Key-Dn=bits 32*n to 32*n+31 of the set S.

Figure 13:
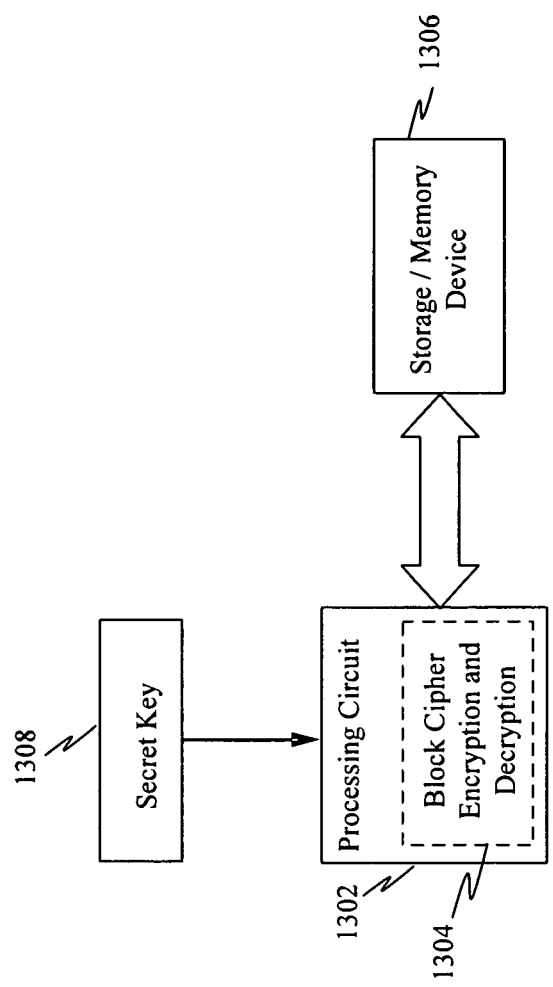
FIG. 13 is a block diagram illustrating a device which may be configured to perform efficient block cipher encryption and decryption.

FIG. 13 is a block diagram illustrating a device which may be configured to perform efficient block cipher encryption and decryption. A processing circuit 1302 may be coupled to a memory device 1306. The processing circuit 1302 may write data to, and read data from, the memory device 1306. The processing circuit 1302 may be configured to execute a block cipher 1304 that encrypts data to be stored to, decrypts data to be retrieved from, the memory device 1306. Such encryption and decryption may be based on the actual memory address to which the data is written or from which the data is read. For example, the block cipher 1304 may perform one or more of the operations described in FIGS. 1-12.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in FIGS. 1, 2, 3, 4, 5, 6, 7, 8, 9, 10, 11, 12, and/or 13 may be rearranged and/or combined into a single component, step, or function or embodied in several components, steps, or functions. Additional elements, components, steps, and/or functions may also be added. The apparatus, devices, and/or components illustrated in FIGS. 3, 4, 8, 9 and/or 13 may be configured to perform one or more of the methods, features, or steps described in FIGS. 1, 2, 5, 6, 7, 10, 11 and/or 12. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of encrypting data for storage in a memory address of a storage device, comprising:
encrypting, at a processing circuit, the memory address in a first plurality of sequentially iterative block cipher rounds in which an output from a memory address encryption round is used as an input for a next memory address encryption round;
generating data round keys based on encrypted memory address information from one or more intermediate rounds of the first plurality of iterative block cipher rounds;
combining the data with the encrypted memory address after the first plurality of iterative block cipher rounds to obtain a combined data;
encrypting the combined data in a second plurality of sequentially iterative block cipher rounds, in which an output from a data encryption round is used as an input for the next data encryption round, using the data round keys; and
storing the encrypted combined data in the memory address of the storage device.

2. The method of claim 1 wherein encrypting the memory address begins before the data is available.

3. The method of claim 1 wherein encrypting the memory address includes:
   transforming the memory address according to a first transform function; and
   mixing the transformed memory address with a round key.

4. The method of claim 1 wherein generating the data round keys includes:
   extracting a plurality of bits from a plurality of intermediate rounds of the encrypted memory address for at least some of the first plurality of sequentially iterative block cipher rounds; and
   selecting the data round keys from segments of the extracted plurality of bits.

5. The method of claim 4 wherein generating the data round keys includes:
   concatenating the extracted plurality of bits into a string from which the data round keys are selected.

6. The method of claim 4 wherein the data round keys used for earlier rounds of the second plurality of block cipher rounds are generated using bits from the encrypted memory address from later rounds of the first plurality of sequentially iterative block cipher rounds.

7. The method of claim 1 wherein the data is combined with the encrypted memory address by an invertible operation.

8. The method of claim 1 wherein encrypting the combined data includes:
   transforming the combined data according to a second transform function; and
   mixing the transformed combined data with one or more of the data round keys.

9. The method of claim 1 wherein encrypting the combined data further includes:
   segmenting the combined data into a plurality of data segments and
   performing bit substitution on the different data segments.

10. The method of claim 1 wherein the number of block cipher rounds in the second plurality of block cipher rounds is greater than the number of block cipher rounds in the first plurality of sequentially iterative block cipher rounds.

11. The method of claim 1 wherein the combined data is sequentially encrypted over the second plurality of sequentially iterative block cipher rounds.

12. A block cipher device, comprising:
   an address encryption module for encrypting a memory address in a first plurality of sequentially iterative block cipher rounds in which an output from a memory address encryption round is used as an input for a next memory address encryption round;
   a key scheduling module for generating data round keys based on encrypted memory address information from one or more intermediate rounds of the first plurality of sequentially iterative block cipher rounds;
   a combiner for combining data with the encrypted memory address after the first plurality of sequentially iterative block cipher rounds to obtain a combined data; and
   a data encryption module for encrypting the combined data in a second plurality of sequentially iterative block cipher rounds, in which an output from a data encryption round is used as an input for the next data encryption round, using the data round keys.

13. The device of claim 12 wherein encrypting the memory address begins before the data is available.

14. The device of claim 12 wherein the address encryption module is further configured to:
   transform the memory address according to a first transform function; and
   mix the transformed memory address with a round key.

15. The device of claim 12 wherein the key scheduling module is further configured to:
   extract a plurality of bits from the encrypted memory address for at least some of the first plurality of sequentially iterative block cipher rounds; and
   select the data round keys from segments of the extracted plurality of bits.

16. The device of claim 15 wherein the key scheduling module is further configured to:
   concatenate the extracted plurality of bits into a string from which the data round keys are selected.

17. The device of claim 15 wherein the data round keys used for earlier rounds of the second plurality of block cipher rounds are generated using bits from the encrypted memory address from later rounds of the first plurality of sequentially iterative block cipher rounds.

18. The device of claim 12 wherein the data encryption module is further configured to:
   transform the combined data according to a second transform function; and
   mix the transformed combined data with one or more of the data round keys.

19. The device of claim 12 wherein the data encryption module is further configured to:
   segment the combined data into a plurality of data segments; and
   perform bit substitution on the different data segments.

20. The device of claim 12 wherein the number of block cipher rounds in the second plurality of block cipher rounds is greater than the number of block cipher rounds in the first plurality of sequentially iterative block cipher rounds.

21. The device of claim 12 wherein the combined data is sequentially encrypted over the second plurality of sequentially iterative block cipher rounds.

22. A block cipher device comprising:
   means for encrypting a memory address in a first plurality of sequentially iterative block cipher rounds in which an output from a memory address encryption round is used as an input for a next memory address encryption round;
   means for generating data round keys based on encryted memory address information from one or more intermediate rounds of the first plurality of sequentially iterative block cipher rounds;
   means for combining data with the encrypted memory address after the first plurality of sequentially iterative block cipher rounds to obtain a combined data; and
   means for encrypting the combined data in a second plurality of sequentially iterative block cipher rounds, in which an output from a data encryption round is used as an input for the next data encryption round, using the data round keys.

23. A processor including a processing circuit adapted to:
   encrypt a memory address in a first plurality of sequentially iterative block cipher rounds in which an output from a memory address encryption round is used as an input for a next memory address encryption round;
   generate data round keys based on encrypted memory address information from one or more intermediate rounds of the first plurality of sequentially iterative block cipher rounds;
   combine data with the encrypted memory address after the first plurality of sequentially iterative block cipher rounds to obtain a combined data; and
   encrypt the combined data in a second plurality of sequentially iterative block cipher rounds, in which an output from a data encryption round is used as an input for the next data encryption round, using the data round keys.

24. A non-transitory machine-readable medium comprising instructions for block cipher encryption, which when executed by one or more processors causes the processors to:

encrypt a memory address in a first plurality of sequentially iterative block cipher rounds in which an output from a memory address encryption round is used as an input for a next memory address encryption round;

generate data round keys based on encrypted memory address information from one or more intermediate rounds of the first plurality of sequentially iterative block cipher rounds;

combine data with the encrypted memory address after the first plurality of sequentially iterative block cipher rounds to obtain a combined data; and encrypt the combined data in a second plurality of sequentially iterative block cipher rounds, in which an output from a data encryption round is used as an input for the next data encryption round, using the data round keys.

25. A method of decrypting data retrieved from a memory address of a storage device, comprising:

encrypting, at a processing circuit, the memory address in a first plurality of sequentially iterative block cipher rounds, in which an output from a memory address encryption round is used as an input for a next memory address encryption round, to obtain an encrypted memory address;

generating data round keys based on encrypted memory address information from one or more intermediate rounds of the first plurality of sequentially iterative block cipher rounds;

retrieving the encrypted data from the memory address of the storage device;

decrypting the encrypted data in a second plurality of the sequentially iterative block cipher rounds, in which an output from a data decryption round is used as an input for the next data decryption round, using the data round keys to obtain a partially decrypted data; and combining the partially decrypted data with the encrypted memory address to obtain fully decrypted data.

26. The method of claim 25 wherein encrypting the memory address begins before the data is available.

27. The method of claim 25 wherein encrypting the memory address includes transforming the memory address according to a first transform function; and mixing the transformed memory address with a round key.

28. The method of claim 25 wherein generating the data round keys includes extracting a plurality of bits from a plurality of intermediate rounds of the encrypted memory address for at least some of the first plurality of sequentially iterative block cipher rounds; and selecting the data round keys from segments of the extracted plurality of bits.

29. The method of claim 28 wherein generating the data round keys includes concatenating the extracted plurality of bits into a string from which the data round keys are selected.

30. The method of claim 28 wherein the data round keys used for earlier rounds of the second plurality of block cipher rounds are generated using bits from the encrypted memory address from the earlier rounds of the first plurality of sequentially iterative block cipher rounds.

31. The method of claim 25 wherein the partially decrypted data is combined with the encrypted memory address by an invertible operation.

32. The method of claim 25 wherein decrypting the encrypted data includes transforming the encrypted data according to a second inverse transform function; and mixing the transformed encrypted data with one or more of the data round keys.

33. The method of claim 25 wherein the number of block cipher rounds in the second plurality of block cipher rounds is greater than the number of block cipher rounds in the first plurality of sequentially iterative block cipher rounds.

34. The method of claim 25 wherein the first plurality of sequentially iterative block cipher rounds are concurrently executed with the second plurality of block cipher rounds.

35. A block cipher device, comprising:

an address encryption module for encrypting a memory address in a first plurality of sequentially iterative block cipher rounds, in which an output from a memory address encryption round is used as an input for a next memory address encryption round, to obtain an encrypted memory address;

a key scheduling module for generating data round keys based on encrypted memory address information intermediate rounds from one or more of the first plurality of sequentially iterative block cipher rounds;

a data decryption module for decrypting encrypted data in a second plurality of sequentially iterative block cipher rounds, in which an output from a data decryption round is used as an input for the next data decryption round, using the data round keys to obtain partially decrypted data; and a combiner for combining the partially decrypted data with the encrypted memory address to obtain fully decrypted data.

36. The device of claim 35 wherein encrypting the memory address begins before the data is available.

37. The device of claim 35 wherein the key scheduling module is further configured to:

extract a plurality of bits from the encrypted memory address for at least some of the first plurality of sequentially iterative block cipher rounds; and select the data round keys from segments of the extracted plurality of bits.

38. The device of claim 35 wherein the data round keys used for earlier rounds of the second plurality of block cipher rounds are generated using bits from the encrypted memory address from earlier rounds of the first plurality of sequentially iterative block cipher rounds.

39. The device of claim 35 wherein the number of block cipher rounds in the second plurality of block cipher rounds is greater than the number of block cipher rounds in the first plurality of sequentially iterative block cipher rounds.

40. A block cipher device comprising:

means for encrypting a memory address in a first plurality of sequentially iterative block cipher rounds, in which an output from a memory address encryption round is used as an input for a next memory address encryption round, to obtain an encrypted memory address;

means for generating data round keys based on encrypted memory address information from one or more intermediate rounds of the first plurality of sequentially iterative block cipher rounds;

means for decrypting the encrypted data in a second plurality of sequentially iterative block cipher rounds, in which an output from a data decryption round is used as an input for the next data decryption round, using the data round keys to obtain a partially decrypted data; and means for combining the partially decrypted data with the encrypted memory address to obtain a fully decrypted data.

41. The device of claim 40, further comprising:
means for retrieving the encrypted data from the memory address.

42. A processor including a processing circuit adapted to:
encrypt a memory address in a first plurality of sequentially iterative block cipher rounds, in which an output from a memory address encryption round is used as an input for a next memory address encryption round, to obtain an encrypted memory address;
generate data round keys based on encrypted memory address information from one or more intermediate rounds of the first plurality of sequentially iterative block cipher rounds;
decrypt encrypted data in a second plurality of sequentially iterative block cipher rounds, in which an output from a data decryption round is used as an input for the next data decryption round, using the data round keys to obtain partially decrypted data; and
combine the partially decrypted data with the encrypted memory address to obtain fully decrypted data.

43. A non-transitory machine-readable medium comprising instructions for block cipher decryption, which when executed by one or more processors causes the processors to:
encrypt a memory address in a first plurality of sequentially iterative block cipher rounds, in which an output from a memory address encryption round is used as an input for a next memory address encryption round, to obtain an encrypted memory address;
generate data round keys based on encrypted memory address information from one or more intermediate rounds of the first plurality of sequentially iterative block cipher rounds;
decrypt encrypted data in a second plurality of sequentially iterative block cipher rounds, in which an output from a data decryption round is used as an input for the next data decryption round, using the data round keys to obtain partially decrypted data; and
combine the partially decrypted data with the encrypted memory address to obtain fully decrypted data.

44. The method of claim 1, wherein generation of the data round keys is initiated prior to completion of the first plurality of sequentially iterative block cipher rounds.

45. The method of claim 1, wherein early data round keys are computed based on encrypted memory address information from later intermediate rounds of the first plurality of sequentially iterative block cipher rounds.

46. The method of claim 1, wherein generation of the data round keys overlaps with encrypting of the memory address.

47. The method of claim 1, wherein the encrypted memory address information from one or more intermediate rounds of the first plurality of sequentially iterative block cipher rounds are intermediate results between two or more block cipher rounds.

48. The method of claim 1, wherein the data round keys are generated from a plurality of intermediate round results from the first plurality of sequentially iterative block cipher rounds for the encrypted memory address, and the plurality of intermediate round results from the first plurality of sequentially iterative block cipher rounds are used in a reverse order of generation to generate the data round keys.

49. The method of claim 25, wherein the data round keys are generated from a plurality of intermediate round results from the first plurality of sequentially iterative block cipher rounds for the encrypted memory address, and the plurality of intermediate round results from the first plurality of sequentially iterative block cipher rounds are used in a same order of generation to generate the data round keys.

* * * * *